Feb. 1, 1944. H. C. PRITCHARD ET AL 2,340,768
GYROSCOPIC APPARATUS
Filed Nov. 30, 1942

INVENTORS
HAROLD CHARLES PRITCHARD &
JEFFERY WALTON BARNES
BY
Herbert H. Thompson
ATTORNEY Patented Feb. 1, 1944

2,340,768

UNITED STATES PATENT OFFICE 2,340,768

GYROSCOPIC APPARATUS

Harold Charles Pritchard and Jeffery Walton Barnes, Farnborough, England, assignors to The Sperry Gyroscope Company Limited, Brentford, England, a British company Application November 30, 1942, Serial No. 467,456, In Great Britain March 22, 1941

3 Claims. (Cl. 74—5)

In gyroscopic apparatus used on moving vehicles for defining a direction which is fixed relative to the earth, it is customary to control random precessions of an otherwise free gyroscope by control devices affected by the earth's gravitational field. The accuracy of the gyroscopic apparatus may be adversely affected by such control devices when a horizontal acceleration acts on the vehicle for a sufficient time. In particular, the gyroscopic apparatus will be adversely affected during turning of the vehicle.

When such apparatus is used in aircraft for defining the vertical direction it is usual to employ a free and balanced gyroscope having its axis of rotation vertical and with separate control devices operating respectively about the pitch axis and the roll axis of the aircraft. When no horizontal acceleration is present and the gyro axis is displaced from the vertical the control devices will bring the gyroscope to the vertical at certain angular rates. These rates may be termed the pitch erection rate and the roll erection rate; usually they are equal to one another.

The chief object of the present invention is to ensure that:

(a) During approximately straight flight, the gyroscope will be controlled in the normal manner provided that it is never grossly in error.

(b) During turning flight in which the predetermined value of horizontal acceleration is exceeded the roll erection rate will be cut out. Errors due to random precession of the gyroscope would normally be accumulated in the absence of the roll erection device; in turning flight, however, such errors will not accumulate because errors in roll indication will be converted, as the aircraft turns, into errors in pitch indication, which will be counteracted by the pitch erecting device. For example, an error in roll indication in the gyroscopic apparatus is wholly converted into an error in pitch indication when the aircraft has turned through 90° about a vertical axis, assuming that the gyro axis has not changed its direction during the turn. When the aircraft is turning, the error in roll indication is gradually converted into error in pitch indication, and the apparatus can in effect be controlled about both pitch and roll axes by the pitch erecting device alone.

Having the above object in view the present invention provides gyroscopic apparatus in the form of a gyro-vertical for use on moving vehicles especially aircraft, comprising a free gyroscope with vertical spin axis mounted in substantially neutral gravitational equilibrium, and separate gravity-responsive control devices for controlling the application of torques to produce erection of the gyroscope in the plane of pitch and in the plane of roll respectively, characterized by the fact that the control devices are so constructed that no torque is applied by them to produce precession in the plane of pitch if the lateral acceleration of the craft exceeds a predetermined value, whereas the means for producing precession in the plane of roll remain operative irrespective of acceleration of the craft.

An embodiment of the invention is shown in the accompanying drawing as applied to a well known type of aircraft instrument for defining deviation of an aircraft in pitch and roll.

In the drawing Fig. 1 shows the gyroscope in elevation looking forward along the line of flight or roll axis.

The gyro wheel or rotor (not shown) having its axis approximately vertical is contained in a casing 1, which is mounted in the gimbal ring 2 by pivots at 3 and 4. This gimbal ring in turn is mounted in the instrument casing by two similar pivots one of which is shown at 5. The gyro wheel or rotor is driven by air jets mounted in the gyro casing and fed through passages formed in the gimbal ring and around two of the pivots. These are not shown. The exhaust air from the jets escapes from the gyro casing through all or some of two pairs of opposite ports 6, 8 and 7, 9. These ports may be covered wholly or in part by two pairs of opposite flaps 10, 12, and 11, 13, which are pendulously mounted on the casing to move relatively across the ports and will hereinafter be termed pendulums. The opposite pendulums of each pair are connected together by a spindle passing through the casing, the ends of these spindles being shown at 14, 15 and 16.

Figure 1:
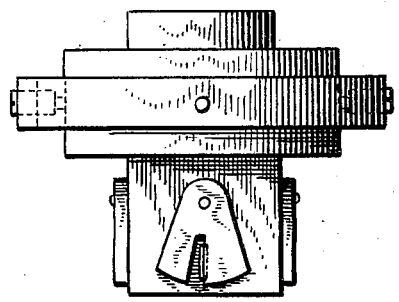
Figure 2:
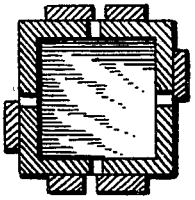
Fig. 2 shows the lower part of the gyro casing in sectional plan.
Figure 3:
Fig. 3 shows one of the pendulums used for pitch erection.

In the instrument, as now known, all the pendulums are of the form shown in Fig. 3. When the gyro axis is vertical and no horizontal acceleration is applied, each pendulum covers half its corresponding port, under which conditions the four air jets issuing from the ports balance each other and there is no resultant force on the gyroscope. If, however, the gyroscope is displaced from the vertical, say about the pitch axis, and no horizontal acceleration is applied, one of the ports, 7 or 9, will be more covered and the other less covered by the pendulums 11 and 13 in consequence of their angular displacement relative to the gyroscope. This action will cause a resultant torque due to the difference of jet reactions about the roll axis, causing the gyroscope to precess about the pitch axis in such a direction as to bring the gyro axis back to the vertical; similar erecting action takes place about the roll axis due to similar action by the ports 6 and 8. However during a turn in which a considerable horizontal centripetal acceleration is present, the gyroscope will start precessing towards an apparent vertical defined by the pendulums 10 and 12, thus accumulating an error in roll. According to the present invention however, this error is avoided by providing the roll pendulums 10 and 12 with extension pieces 17 and 18, respectively, but leaving the pitch pendulums 11 and 13 unaltered, i. e., as in Fig. 3. It will be noted that a considerable centripetal acceleration due to turning of the aircraft will cause the pendulums 10 and 12 to move so far that both ports 6 and 8 will be fully covered by the extension pieces 17 and 18, respectively, thus eliminating all roll erection under these conditions.

What we claim is:

1. A gyro vertical for dirigible craft with fore and aft and athwartship axes including a rotor, a universally mounted case in which said rotor spins about a normally vertical axis, a pair of torque exerting opposite air jet means in the case normally directing jets parallel to the athwartship axis of the craft, a pair of torque exerting opposite air jet means in the case normally directing jets parallel to the fore and aft axes of the craft, a pair of single vane pendulous shutters pivotally mounted on said case operable to differentially intercept the pair of athwartship directed jets, and a pair of double vane pendulous shutters pivotally mounted on said case for the fore and aft directed jets that operate to normally differentially intercept the jets and to render the jets ineffective during turns of the craft.

2. A gyro vertical as claimed in claim 1, in which the respective vanes of the double vane pendulous shutters are situated on opposite sides of a radially extending slot in each of the shutters.

3. A gyro vertical for dirigible craft with fore and aft and athwartship axes having a rotor, a universally mounted case in which said rotor spins about a normally vertical axis, said case including a double pair of ports therein through which air effective to exert a torque on the case is normally discharged, one pair of said ports being arranged to normally direct air parallel to the athwartship axis of the craft and the other pair of said ports being arranged to normally direct air parallel to the fore and aft axes of the craft, a pair of single vane pendulous shutters pivotally mounted on said case operable to differentially control the discharge of air from the athwartship directing pair of ports, and a pair of double vane pendulous shutters pivotally mounted on said case for the fore and aft directing pair of ports that operate to normally differentially control the discharge of air from the ports and to block said ports during turns of the craft.

HAROLD CHARLES PRITCHARD.
JEFFERY WALTON BARNES.